United States Patent
Farmer

(10) Patent No.: US 9,005,786 B2
(45) Date of Patent: Apr. 14, 2015

(54) INTEGRATED CELL VOLTAGE SENSE LINE FUSING

(75) Inventor: Chris R. Farmer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 13/278,283

(22) Filed: Oct. 21, 2011

(65) Prior Publication Data

US 2013/0101869 A1    Apr. 25, 2013

(51) Int. Cl.
| H01M 2/06 | (2006.01) |
| H01M 10/42 | (2006.01) |
| H01M 2/02 | (2006.01) |
| H01M 2/10 | (2006.01) |
| H01M 2/26 | (2006.01) |
| H01M 10/0525 | (2010.01) |
| H01M 2/16 | (2006.01) |

(52) U.S. Cl.
CPC ............ H01M 10/42 (2013.01); H01M 2/0267 (2013.01); H01M 2/1066 (2013.01); H01M 2/1653 (2013.01); H01M 2/26 (2013.01); H01M 10/0525 (2013.01); H01M 10/4257 (2013.01); H01M 2010/4271 (2013.01); H01M 2200/103 (2013.01); Y02E 60/122 (2013.01); Y02T 10/7011 (2013.01)

(58) Field of Classification Search
USPC ..................... 429/7, 61, 92, 177, 50
See application file for complete search history.

(56) References Cited

U.S. PATENT DOCUMENTS

| 2006/0093896 | A1* | 5/2006 | Hong et al. ...................... 429/61 |
| 2008/0096105 | A1* | 4/2008 | Lee et al. ........................ 429/163 |
| 2008/0169788 | A1* | 7/2008 | Bobbin et al. ................. 320/135 |
| 2009/0023062 | A1* | 1/2009 | Kim ............................... 429/163 |
| 2009/0154048 | A1* | 6/2009 | Jang et al. ...................... 361/106 |
| 2009/0176155 | A1* | 7/2009 | Choi ............................... 429/178 |
| 2011/0135971 | A1* | 6/2011 | Ahn ................................. 429/7 |
| 2011/0293977 | A1* | 12/2011 | Kim et al. ........................ 429/94 |
| 2012/0070697 | A1* | 3/2012 | Baek et al. ......................... 429/7 |

FOREIGN PATENT DOCUMENTS

| CN | 1767232 A | 5/2006 |
| CN | 1957488 A | 5/2007 |
| CN | 101295776 A | 10/2008 |
| CN | 101465413 A | 6/2009 |
| DE | 102010051669 A1 | 5/2012 |
| DE | 102011117474 A1 | 5/2013 |

* cited by examiner

*Primary Examiner* — Muhammad Siddiquee
(74) *Attorney, Agent, or Firm* — Fraser Clemens Martin & Miller LLC; James D. Miller

(57) ABSTRACT

Lithium-ion batteries, unlike other chemistries, may need the voltage of every cell monitored. This may employ a wiring harness or interconnect board that connects the leads of each cell to battery monitoring electronics. These leads can be protected from each other by one or more methods including physical segregation, insulation, and fusing. If a fuse is used it can be located as close as possible to the terminal of the cell. The fuse can be located inside the sealed compartment of the cell itself. The leads would be passed out of the cell in a second location allowing the use of alternative sense lead wiring harnesses or interconnect board designs that save on packaging cost and volume. By locating the fuse inside the cell, design and validation efforts involved in placing a fuse inline with the wiring harness are eliminated.

20 Claims, 1 Drawing Sheet

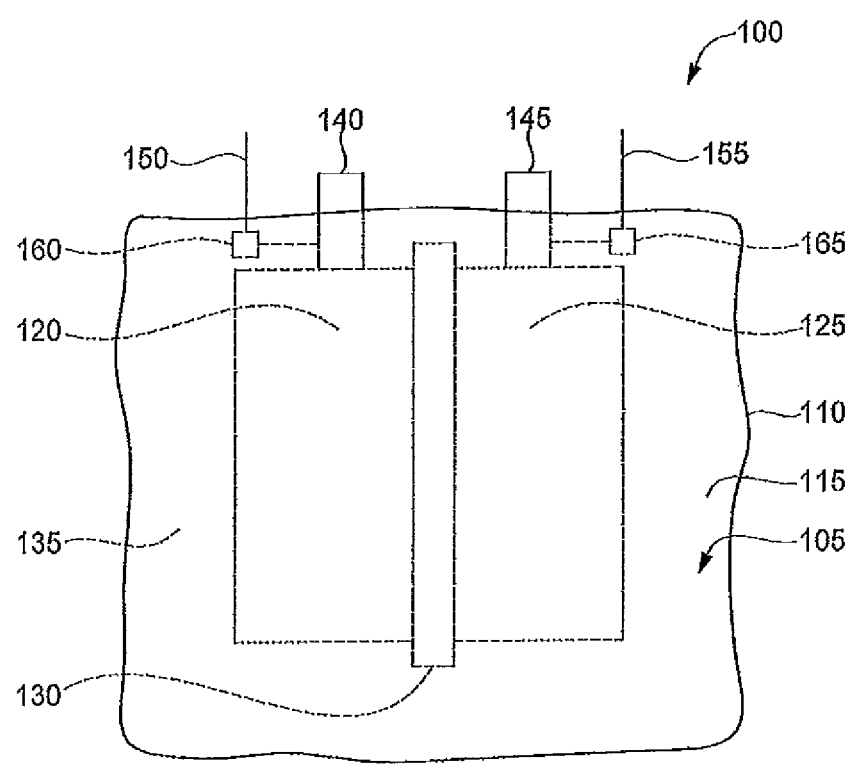

INTEGRATED CELL VOLTAGE SENSE LINE FUSING

FIELD OF THE INVENTION

The present technology relates to lithium-ion batteries, including fusing to mitigate the effects of short-circuiting.

BACKGROUND OF THE INVENTION

This section provides background information related to the present disclosure which is not necessarily prior art.

A lithium-ion battery includes a negative electrode, a positive electrode, and a separator there between. When the battery is charging, positively charged lithium ions move through an electrolyte from the positive electrode (cathode) to the negative electrode (anode), and in the opposite direction when the battery is discharging. The electrolyte can include a lithium salt, such as $LIPF_6$, dissolved in an organic solvent, such as a mixture of linear and cyclic carbonate solvents.

Lithium-ion battery technology is used in many electrical devices including hybrid and electric vehicles. Batteries based on lithium-ion chemistry can be lighter than batteries based on nickel metal hydride and lead acid. Because an energy density of a lithium-ion battery can be higher than other battery types, lithium-ion batteries can boost both the range and power of hybrid and electric vehicles.

However, abusive electrical, thermal, or mechanical conditions can cause a lithium-ion battery to undergo self-heating and/or form ruptures in packaging, which can lead to incidents of undesirable performance. For example, abusive electrical conditions include overcharging the battery. Lithium-ion batteries can consequently cease functioning when subjected to high temperatures that may result from the abusive electrical conditions. These conditions can spread to adjacent cells.

Accordingly, the charge of a lithium ion battery can be monitored at any given time to ensure proper operation and use of the battery, for example, as the battery goes through various charging and discharging cycles. In this way, overcharging of the battery and high temperatures associated therewith can be mitigated. Monitoring can also help to manage and optimize the useful lifespan of the battery and can serve as an indicator for timely replacement of a battery that may be approaching the end of its service life.

SUMMARY OF THE INVENTION

The present technology includes systems, processes, articles of manufacture, and compositions that relate to a battery having an internal overcurrent protection device within the sealed battery cell, where the device protects a sensing lead running to a battery monitoring system.

In some embodiments, a battery comprises a container, an electrode assembly, a first tab, a first overcurrent protective device, and a first lead. The electrode assembly is disposed within the container and includes a first electrode. The first tab is electrically coupled to the first electrode and the first tab traverses the container. The first overcurrent protective device is disposed within the container and is electrically coupled to the first electrode. The first lead is electrically coupled to the first overcurrent protective device and traverses the container.

In some embodiments, a lithium-ion battery is provided. The lithium-ion battery includes a container comprising a flexible, hermetically sealed pouch. An electrolyte is disposed within the container, where the electrolyte includes a lithium salt and an organic solvent. An electrode assembly is disposed within the container, the electrode assembly has a first electrode, a second electrode, and a separator disposed between the first and second electrodes. A first tab is electrically coupled to the first electrode and traverses the container. A second tab is electrically coupled to the second electrode and traverses the container. A first overcurrent protective device is disposed within the container and is electrically coupled to the first electrode. A second overcurrent protective device is also disposed within the container and is electrically coupled to the second electrode. A first lead is electrically coupled to the first overcurrent protective device and traverses the container. And a second lead is electrically coupled to the second overcurrent protective device and also traverses the container.

In some embodiments, a method of protecting a battery monitoring system is provided. The method includes interrupting an electrical current between a battery and the battery monitoring system using a first overcurrent protective device disposed within the battery. The battery used in the method can include embodiments of the batteries described herein.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawing described herein is for illustrative purposes only of selected embodiments and not all possible implementations, and is not intended to limit the scope of the present disclosure.

The drawing depicts a fragmentary top plan view of a battery in accordance with an embodiment of the present technology.

DETAILED DESCRIPTION OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments.

The voltage of every cell in a lithium-ion battery can be monitored by using leads, a wiring harness, and/or an interconnect board that connects electrode plates or terminals or tabs of each cell to battery monitoring electronics. Leads can be protected from each other in one or more ways, including physically segregating, insulating, and/or equipping the leads with a fuse. In some cases, when the fuse is used, it can be located as close as possible to the electrode plates of the cell.

The present technology includes locating a fuse for a sensing lead inside a sealed compartment of a battery. The sensing leads can be passed out of the battery in various locations to allow coupling with various sensing lead wiring harnesses or interconnect board designs. In this manner, the sensing leads, wiring harnesses, or interconnect boards do not require a fuse, which can save on packaging cost and volume. By locating the fuse inside the cell, design and validation efforts involved in placing a fuse inline with the sensing lead, wiring harness, or the interconnect board are eliminated. Batteries made in any configuration can benefit from this design.

The drawing illustrates a lithium ion battery 100 that may be used in vehicle applications. The battery 100 includes an electrode assembly 105 and a container 110, which can be formed with an interior region 115 for receiving the electrode assembly 105. Components of the electrode assembly 105 and container 110 are illustrative of the basic components of the battery 100, which can assume various sizes, shapes, and forms, and are not intended to be restricted to any particular orientation or scale as shown in the drawing.

As shown, the electrode assembly 105 includes a first electrode 120, a second electrode 125, and a separator 130 arranged between the first and second electrodes 120, 125. The separator 130 prevents a short circuit between the first and second electrodes 120, 125 and allows lithium ions to pass through therethrough. The electrode assembly 105 can be formed by winding the first electrode 120, the separator 130, and the second electrode 125 into a spiral or jelly roll type structure. Alternatively, as shown in the drawing, the first electrode 120, the separator 130, and the second electrode 125 can be sequentially laminated into a stacked structure. The first electrode 120 can be a negative electrode, while the second electrode 125 can be a positive electrode, although the reverse arrangement is contemplated. An electrolyte 135 can be introduced within the interior region 115 of the container 110 and the container 110 can be sealed.

A first tab 140 and a second tab 145 are electrically connected to the respective first and second electrodes 120, 125 of the electrode assembly 105. The first and second tabs 140, 145 can be configured wherein portions are be exposed outside of the container 110. For example, the tabs 140, 145 can traverse the container 110, where the tabs 140, 145 pass through a boundary defined by the container 110 such as a side of the container 110. The portions exposed outside of the container can operate as terminals for the battery 100. Portions of the first and second electrode tabs 140, 145 that come in contact with the container 110 can be insulated, for example by a wrap of an insulating tape (not shown). The embodiment of the container 110 shown in the drawing includes four sides, where the first and second tabs 140, 145 exit the same side of the container 110. However, it is contemplated that the tabs 140, 145 can have different orientations and can exit the container 110 on different sides and in different directions, including opposite directions, and that the container 110 may assume various shapes, including shapes having circular or various polygonal cross-sections.

In some embodiments, the first electrode 120, the second electrode 125, and the separator 130 form a single cell in the electrode assembly 105 of the battery 100 as shown in the drawing. However, the electrode assembly 105 can include a plurality of such cells where the respective negative electrodes are electrically coupled and the respective positive electrodes are electrically coupled (not shown). For example, multiple electrodes of multiple cells can be connected using an interconnecting member or internal weld plate (not shown). The interconnecting member or internal weld plate can form a portion of the respective tabs 140, 145 or can be electrically connected to the tabs 140, 145. In this manner, the electrode assembly 105 of the battery 100 can include a plurality of cells connected in parallel.

Monitoring of the electrode assembly 105 within the container 110 of the battery 100 can be accomplished using a first lead 150 and a second lead 155 that are connected to the first and second electrodes 120, 125. As shown in the drawing, the first and second leads 150, 155 extend between the exterior and the interior of the container 110, and include a first overcurrent protective device 160 and a second overcurrent protective device 165 such as fuses disposed therein. The leads 150, 155 can traverse the container 110 via one or more passthroughs that are located on the container 110 where desired. The first and second overcurrent protective devices 160, 165 are shown coupled to the first and second tabs 140, 145, but the overcurrent protective devices 160, 165 can be coupled directly to the first and second electrodes 120, 125. The first and second leads 150, 155 can be used to sense and monitor a charge state of the battery 100 and can be coupled to a battery monitoring system (not shown) that regulates a charge/discharge of the battery through the tabs 140, 145.

As shown, the leads 150, 155 are on the same side of the container 110 and are adjacent to the tabs 140, 145. However, it is contemplated that the leads 150, 155 can have different orientations and can exit different sides of the container 110, including opposite sides. The leads 150, 155 can also exit the container 110 from a different side or direction than the tabs 140, 145. For example, the first and second tabs 140, 145 can exit the pouch in different directions from each other (e.g., opposite ends) while the first and second leads 150, 155 can exit the pouch perpendicular to the tabs 140, 145.

The first electrode 120 can be formed by coating a shaped metal plate such as a negative collector with a negative active material. The metal plate can comprise a copper film or foil while the negative active material can be formed from a carbon material as a main component along with a binder and a conductive material. The first electrode 120 is electrically connected to the first tab 140.

The second electrode 125 can be formed by coating a shaped metal plate such as a positive collector with a positive active material. The metal plate can comprise an aluminum film or foil while the positive active material can be formed from a lithium based oxide as a main component along with a binder and a conductive material. The second electrode 125 is electrically connected to the second tab 145.

The separator 130 can include a polyethylene film, a polypropylene film, or a combination thereof. The separator 130 can be formed to be wider than the first and second electrodes 120, 125 as shown in the drawing to prevent a short circuit between the first and second electrodes 120, 125, although other configurations can be used.

The electrolyte 135 can include a liquid comprising one or more lithium salts such as $LiPF_6$, $LiBF_4$, and $LiClO_4$ and an organic solvent such as a carbonate, including mixtures of linear and/or cyclic carbonates. The electrolyte 135 conducts lithium ions which act as a carrier between the first electrode 120 and the second electrode 125 when the lithium ion battery 100 passes an electric current through an external circuit.

The container 110 is formed from a wide variety of materials including materials that can be both flexible and heat sealable wherein no gas or liquid may leave or enter the battery 100. For example, the container 110 can include a pouch comprising a laminate material of aluminum and plastic that is heat sealable. The container 110 can be hermetically sealed and the passthrough locations of any components of the battery 100 that traverse the container 110, such as tabs 140, 145 and leads 150, 155, can maintain the hermetic seal of the container 110.

Both the first electrode 120 and the second electrode 125 are materials into which and from which lithium can migrate. When a cell is discharging, lithium is extracted from the negative electrode (e.g., the first electrode plate 120) and inserted into the positive electrode (e.g., the second electrode plate 125). When the cell is charging, the reverse process occurs, where lithium is extracted from the positive electrode (e.g., the second electrode plate 125) and inserted into the negative electrode (e.g., the first electrode plate 120).

The first and second leads 150, 155 can comprise an electrically conductive material that can be insulated, particularly where the leads 150, 155 traverse the container 110. For example, the leads 150, 155 can include about 0.2 mm nickel foil or similar wire. The leads 150, 155 can be coupled to a battery monitoring system (not shown) for measuring the voltage of the lithium ion battery 100. In this manner, the battery monitoring system can be used to regulate charging and/or discharging of the battery 100 and can mitigate overcharging and other adverse electrical conditions that may impact the battery 100.

The first overcurrent protective device 160 and the second overcurrent protective device 165 are configured to interrupt electrical current through the respective leads 150, 155 and can comprise a sacrificial device such as a fuse or switchable device such as a circuit breaker. In this fashion, the overcurrent protective devices 160, 165 can protect the battery monitoring system from excessive current that may be caused by abusive electrical, thermal, or mechanical conditions experienced by the battery. The battery monitoring system can also be configured to sense when one or both overcurrent protective devices 160, 165 have interrupted electrical current through the leads 150, 155. In some embodiments, the overcurrent protective devices 160, 165 can include an element made of copper, silver, aluminum, zinc, or alloys thereof that provides stable and predictable characteristics. The overcurrent protective devices 160, 165 can be configured to carry a particular current and quickly interrupt the current upon experiencing a current excess. However, the overcurrent protective devices 160, 165 can be designed so that current is not interrupted when only minor surges of current are experienced.

In some embodiments, the overcurrent protective devices 160, 165 each include a fuse that can be a surface mountable part or fusible trace on a flexible printed circuit board (FPCB). The FPCB can be placed within the interior 115 of the battery 100 and a portion of the FPCB can be affixed to an edge when the container 110 of the battery 100 is sealed during fabrication, for example. The FPCB can be in electrical communication with the exterior of the battery 100, for example, by using the leads 150, 155 as shown. Locating the overcurrent protective devices 160, 165 at an edge of the container 110 prevents interference with the electrodes 120, 125 and separator 130 of the electrode assembly 105. The FPCB can have a conductive connection to one of the electrodes 120, 125, one of the tabs 140, 145, or an interconnecting member or cell internal weld where multiple electrodes in a multicell battery are connected (not shown). Another conductive connection can be made from the FPCBs to the leads 150, 155.

The present technology provides several benefits to increase durability, quality, and function across different battery systems. The benefits include minimizing the cost of validation for battery and monitoring system designs, minimizing a volume and configuration of the system, and optimizing battery monitoring. For example, battery and monitoring system layouts can change frequently for a given system and/or vehicle design, but basic battery cell design does not change as frequently. Accordingly, by integrating an overcurrent protection device into the battery, it eliminates part of the design work in connecting a monitoring system to each new battery concept while retaining a validated and durable sensing line monitoring connection.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A battery comprising:
    a sealed container defining a continuous interior region;
    an electrolyte disposed within the continuous interior region;
    an electrode assembly disposed within the continuous interior region, the electrode assembly including a first electrode;
    a first tab electrically coupled to the first electrode, the first tab exiting the container;
    a first overcurrent protective device disposed within the continuous interior region and electrically coupled to the first electrode; and
    a first lead electrically coupled to the first electrode within the continuous interior region, the first lead further electrically coupled to the first overcurrent protective device within the continuous interior region and subsequently exiting the container.

2. The battery of claim 1, wherein the first overcurrent protective device is electrically coupled to the first electrode via the first tab.

3. The battery of claim 1, wherein:
    the electrode assembly further comprises a second electrode and a separator disposed between the first electrode and the second electrode; and
    the battery further comprises:
        a second tab electrically coupled to the second electrode, the second tab exiting the container;
        a second overcurrent protective device disposed within the continuous interior region and electrically coupled to the second electrode; and
        a second lead electrically coupled to the second overcurrent protective device, the second lead exiting the container.

4. The battery of claim 3, wherein the second overcurrent protective device is electrically coupled to the second electrode via the second tab.

5. The battery of claim 3, wherein the first electrode comprises a negative collector with a negative active material and the second electrode comprises a positive collector with a positive active material.

6. The battery of claim 3, wherein the separator includes one of a polyethylene film, a polypropylene film, and combinations thereof.

7. The battery of claim 1, wherein the electrolyte comprises a lithium salt and an organic solvent.

8. The battery of claim 7, wherein the lithium salt includes one of $LiPF_6$, $LiBF_4$, and $LiClO_4$, and the organic solvent includes one of a linear carbonate, cyclic carbonate, and combinations thereof.

9. The battery of claim 1, wherein the container comprises a pouch comprising a laminate material of aluminum and plastic.

10. The battery of claim 1, wherein the first overcurrent protective device comprises a sacrificial device.

11. The battery of claim 1, wherein the first overcurrent protective device comprises a switchable device.

12. The battery of claim 1, wherein the first overcurrent protective device comprises a flexible printed circuit board (FPCB) comprising a fuse or fusible trace.

13. The battery of claim 12, wherein the FPCB is affixed to an edge of the continuous interior region.

14. A lithium-ion battery comprising:
a container comprising a flexible, hermetically sealed pouch defining a continuous interior region;
an electrolyte disposed within the continuous interior region, the electrolyte comprising a lithium salt and an organic solvent;
an electrode assembly disposed within the continuous interior region, the electrode assembly including a first electrode, a second electrode, and a separator disposed between the first electrode and the second electrode;
a first tab electrically coupled to the first electrode, the first tab exiting the container;
a second tab electrically coupled to the second electrode, the second tab exiting the container;
a first overcurrent protective device disposed within the continuous interior region and electrically coupled to the first electrode;
a second overcurrent protective device disposed within the continuous interior region and electrically coupled to the second electrode;
a first lead electrically coupled to the first electrode within the continuous interior region, the first lead further electrically coupled to the first overcurrent protective device within the continuous interior region and subsequently exiting the container; and
a second lead electrically coupled to the second electrode within the continuous interior region, the second lead further electrically coupled to the second overcurrent protective device within the continuous interior region and subsequently exiting the container.

15. The lithium-ion battery of claim 14, wherein the first electrode, the second electrode, and the separator form a cell in the electrode assembly and the electrode assembly further comprises a plurality of cells with the first tab electrically coupled to the first electrode of each cell and the second tab electrically coupled to the second electrode of each cell.

16. The lithium-ion battery of claim 14, wherein the first overcurrent protective device is electrically coupled to the first electrode via the first tab and the second overcurrent protective device is electrically coupled to the second electrode via the second tab.

17. The lithium-ion battery of claim 14, wherein the first overcurrent protective device and the second overcurrent protective device each comprise a flexible printed circuit board (FPCB) comprising a fuse or fusible trace.

18. A method of protecting a battery system comprising:
providing an interruptable electrical current between a battery and a battery monitoring system using a first overcurrent protective device disposed within the battery, wherein the battery comprises:
a sealed container defining a continuous interior region;
an electrolyte disposed within the continuous interior region;
an electrode assembly disposed within the continuous interior region, the electrode assembly including a first electrode;
a first tab electrically coupled to the first electrode, the first tab exiting the container;
the first overcurrent protective device disposed within the continuous interior region and electrically coupled to the first electrode; and
a first lead electrically coupled to the first electrode within the continuous interior region, the first lead further electrically coupled to the first overcurrent protective device within the continuous interior region and subsequently exiting the container and electrically coupled to the battery monitoring system.

19. The method of claim 18, wherein the first overcurrent protective device comprises a fuse.

20. A battery system comprising:
a battery according to claim 1; and
one of a sensing lead wiring harness and an interconnect board electrically coupled to the first lead outside of the container, wherein the electrical coupling between the first lead outside of the container and the one of the sensing lead wiring harness and the interconnect board is non-fused.

* * * * *